Patented Dec. 25, 1951

2,580,025

UNITED STATES PATENT OFFICE 2,580,025

ANTIFOULING PIPE LINE ENAMEL

August Holmes, Cranford, N. J., assignor to Standard Oil Development Company, a corporation of Delaware No Drawing. Application September 4, 1948,
Serial No. 47,941

2 Claims. (Cl. 106—15)

This invention relates to improvements in protective coating compositions and to methods of protecting surfaces against corrosion, and more particularly to the use of asphalts derived from petroleum hydrocarbons for coating compositions. The coating composition of the present invention is particularly adapted for use in salt and brackish tropical waters.

A petroleum crude oil may be distilled to remove the more volatile fractions and produce a more or less fluid residue which remains in the still. This asphaltic residue has various uses such as a bonding agent or by additional processing converted into coating compositions which on application to metallic surfaces prevent corrosion and rusting. Another asphaltic material which can be used for corrosion prevention is the asphaltic residue obtained by distillation of the heavy residual oils resulting from breaking down under heat and pressure of petroleum distillates.

Other asphalts are found naturally in lakes such as in Trinidad and in veins from which they must be mined such as gilsonite, glance pitch and grahamite. Although some of these natural products are admirably suited for the production of asphalt paints in which the protective film is very thin, they are not suited for the production of pipe enamel, which is the object of this invention, without expensive processing.

There are already in use a number of pipe enamels satisfactory for the protection of pipes against corrosion and rusting when the pipe lines or other materials are located in or above the ground but which do not give suitable protection when such construction materials are submerged in sea water and submitted to attack by teredos, barnacles, sponges or other forms of marine growth.

It is the object of this invention to produce an improved bituminous enamel which will be particularly suited for marine service in that its protective function will not be appreciably affected by the action of tropical marine growths even when under the surface of the water for long periods of time.

According to this invention, the improved pipe enamel is obtained by incorporating into the bitumen of suitable consistency and properties, certain toxic materials which inhibit the attack of teredos, barnacles and sponges. These toxic materials are inorganic compounds of heavy metals selected from the class consisting of antimony and barium which compounds have a solubility in the range of .02 to .001% by weight in salt water. Particularly desirable compounds are barium carbonate and antimony oxide.

In preparing the enamels, the bitumen is heated until it is sufficiently fluid but in no case should the temperature be higher than 50° F. below the flash point of the bitumen. A mineral filler is then added and thoroughly mixed in, after which the toxic agent is similarly incorporated.

A number of coating compositions were prepared employing various toxic materials. The coating compositions were utilized to coat pipes and flat sheets of metal. The pipes and the metal sheets were then immersed in the water of Lake Maricaibo, Venezuela, for 20 months. The enamel was applied to the pipe by pouring the same on the pipe while in the case of the sheets or paddles dipping processes were used. The enamels were prepared by mixing 60% asphalt with 40% of the filler and adding thereto 1% to 2% by volume of poisons. The filler consisted of 10 parts mica with 30 parts of slate flour. At the end of 20 months test results were observed which are tabulated in the following table.

| Sample No. | Toxic Compounds | Pipe Test | | | Paddle Test | | |
|---|---|---|---|---|---|---|---|
| | | Sponge | Teredo | Blisters | Sponge | Teredo | Blisters |
| 1 | None | C | C | C | D | D | D |
| 2 | Copper Naphthenate 1% | C | C | C | D | C | A |
| 3 | Copper Naphthenate 2% | B | C | A | D | C | A |
| 4 | Octadecylamine 1% | A | C | C | D | E | C |
| 5 | Octadecylamine 2% | C | D | C | D | C | A |
| 6 | Petroleum Phenols 1% | A | C | B | C | B | A |
| 7 | Petroleum Phenols 2% | D | C | C | B | B | B |
| 8 | Ammoniated Mercuric Chloride 1% | D | C | A | C | C | C |
| 9 | Ammoniated Mercuric Chloride 2% | C | A | C | A | B | B |
| 10 | Chlorinated Naphthalene 1% | A | A | C | E | B | B |
| 11 | Chlorinated Naphthalene 2% | A | C | C | E | B | B |
| 12 | Barium Carbonate 1% | A | A | E | B | A | B |
| 13 | Barium Carbonate 2% | B | A | B | B | B | A |
| 14 | Antimony Oxide 1% | | B | A | A | B | B |
| 15 | Antimony Oxide 2% | | B | B | B | A | A |

A—Coating apparently not affected.
B—Coating slightly affected.
C—Coating moderately affected.
D—Coating severely affected.
E—Coating failure.

As pointed out heretofore the poison is selected from the class of inorganic compounds of heavy metals selected from the class consisting of antimony and barium. It is essential that these compounds have a very slight water solubility preferably in the range from .001 to .02% by weight in salt water. In general the material should have a molecular weight of about 120 and higher. As can be observed from the test, barium carbonate and antimony oxide are outstandingly effective as compared with various other types of poisons.

The bituminous material may be derived from petroleum hydrocarbon by the distillation of coal, shale and the like to secure distillation residues. Suitable bituminous materials comprise petroleum tars and coal tars having ring and ball softening points between 145° F. and 250° F. These can be obtained by the straight reduction of crude petroleum products, or of the tars obtained from cracking petroleum products from the oxidation of straight reduced products from petroleum or from the petroleum tar and from residues derived from the distillation of coal, shale or other organic materials.

A preferred composition comprises an oxidized asphalt in combination with slate flour and mica. The oxidized asphalt is prepared by blowing air through an asphalt having a softening point in the range from about 60° F. to 100° F. This material is heated to a temperature within the range from about 350° F. to 550° F. but not above the flash point of the feed material. The air blowing treatment is continued until the desired softening point of the asphalt is raised to about 200° F. to 250° F.

The concentration of the bituminous material in the coating composition may vary appreciably. In general it is preferred that the concentration of the bituminous material be in the range from about 40–70% and the filler present in the concentration of about 60–30%. Particularly effective compositions are secured when the concentration of bituminous material is in the range from about 55–65%. The filler preferably comprises a mixture of slate flour and mica where approximately 2 to 4 parts of slate flour are employed per part of mica. The amount of poison employed should be in the range from about 0.5% to 5%. As indicated by the test data, effective concentrations are in the range from 1% to 2%.

Having described the invention, it is claimed:

1. An improved coating material suitable for employment in tropical waters which comprises from 0.5 to 5% of antimony oxide and from about 40 to 70% of a bituminous material having a softening point in the range from 200 to 250° F. and a filler.

2. Composition as defined by claim 1 wherein the bituminous material comprises an oxidized asphalt prepared by air-blowing an asphalt having a softening point in the range from about 60 to 100° F.

AUGUST HOLMES.

REFERENCES CITED

The following references are of record in the file of this patent:

UNITED STATES PATENTS

| Number | Name | Date |
| --- | --- | --- |
| 2,096,876 | Bitzer | Oct. 26, 1937 |
| 2,158,771 | Beckwith | May 16, 1939 |
| 2,506,283 | Smith et al. | May 2, 1950 |

FOREIGN PATENTS

| Number | Country | Date |
| --- | --- | --- |
| 169,758 | Great Britain | Oct. 3, 1921 |
| 473,184 | Great Britain | Oct. 1, 1937 |
| 480,049 | Great Britain | Feb. 16, 1938 |

OTHER REFERENCES

Circular No. 259, Scientific Sec., Paint Mfg. Assoc. of U. S., January 1926, pp. 240–241.